United States Patent [19]

Snyder et al.

[11] Patent Number: 5,423,978
[45] Date of Patent: Jun. 13, 1995

[54] ROTATING BIOLOGIC AQUARIUM FILTER SYSTEM

[75] Inventors: Wilfred P. Snyder, Thousand Oaks; Charles O. Fuerst; Joseph S. Bussing, both of Simi Valley, all of Calif.

[73] Assignee: Aquaria Inc., Moorpark, Calif.

[21] Appl. No.: 4,678

[22] Filed: Jan. 14, 1993

Related U.S. Application Data

[63] Continuation of Ser. No. 535,905, Jun. 11, 1990, abandoned.

[51] Int. Cl.$^6$ ............................................. A01K 63/04
[52] U.S. Cl. .................................. 210/151; 210/169; 210/416.2
[58] Field of Search ............. 210/619, 150, 151, 169, 210/416.2

[56] References Cited

U.S. PATENT DOCUMENTS

| | | | |
|---|---|---|---|
| 1,811,181 | 6/1931 | Maltby | 210/150 |
| 2,696,800 | 12/1954 | Rork | 119/5 |
| 2,877,051 | 3/1959 | Cushman | 299/3 |
| 3,723,304 | 3/1973 | Storck | 210/151 |
| 3,849,304 | 11/1974 | Torpey et al. | 210/151 |
| 3,869,380 | 3/1975 | Torpey | 210/619 |
| 3,957,634 | 5/1976 | Orensten | 210/169 |
| 4,157,303 | 6/1979 | Yoshikawa et al. | 210/150 |
| 4,160,736 | 7/1979 | Prosser | 210/150 |
| 4,267,051 | 5/1981 | Uhlmann | 210/150 |
| 4,268,385 | 5/1981 | Yoshikawa | 210/150 |
| 4,282,095 | 8/1981 | Tsuhako | 210/169 |
| 4,284,503 | 8/1981 | Stähler | 210/150 |
| 4,364,826 | 12/1981 | Kato | 210/150 |
| 4,622,148 | 11/1986 | Willinger | 210/169 |
| 4,737,278 | 4/1988 | Miller | 210/150 |
| 5,078,867 | 1/1992 | Danner | 210/169 |
| 5,160,622 | 11/1992 | Gunderson et al. | 210/169 |
| 5,226,986 | 7/1993 | Ellis et al. | 210/169 |

FOREIGN PATENT DOCUMENTS

| | | |
|---|---|---|
| 57-1489 | 1/1982 | Japan . |
| 62-97694 | 5/1987 | Japan . |
| WO8504306 | 10/1985 | WIPO . |
| WO8605770 | 10/1986 | WIPO . |

OTHER PUBLICATIONS

"Filtration Techniques for Small-Scale Aquaculture in a Closed System" by: Steven D. Van Gorder and James D. Fritch.

"Biodisc Waterwheel: A Design Alterntive and its Application for an Air-driven Fish Culture System" by: Douglas J. Strange and Steven Van Gorder.

*Primary Examiner*—Thomas Wyse
*Attorney, Agent, or Firm*—Spensley Horn Jubas & Lubitz

[57] ABSTRACT

An aquarium filter system having a rotatably mounted filter body. The filter body is structured such that when mounted with a portion of the filter body submerged in moving water, rotational movement is imparted to the filter body by the moving water. As a result of the rotational movement, at least a portion of the filter body is alternately exposed to the water and the atmosphere. This fosters the growth of aerobic bacteria on the surface of the filter body. The aerobic bacteria reduces the level of toxins within the aquarium water.

25 Claims, 5 Drawing Sheets

FROM PUMP OR CANISTER FILTER

ROTATING BIOLOGIC AQUARIUM FILTER SYSTEM

This is a continuation of application Ser. No. 07/535,905 filed on Jun. 11, 1990, now abandoned.

BACKGROUND OF THE INVENTION

1. Field of the Invention

The present invention relates to aquarium filter systems, in particular, to aquarium filter systems having rotating biological filter elements.

2. Description of Related Art

Under ideal conditions, a home aquarium will act as a substantially self-contained ecosystem. That is, except for the need of the aquarium operator to provide food to the fish within the aquarium, the ideal aquarium should maintain itself as an environment suitable to sustain and foster the healthy growth of the aquatic life which it contains. However, the aquatic life within the aquarium will typically release wastes and other by-products into the aquarium water. In time, the buildup of undesirable wastes and pollutants can reach toxic levels and eventually poison the aquatic life within the aquarium. As a result, it is necessary for an aquarium to include a system for filtering and purifying the aquarium water to eliminate undesirable wastes and toxins and to maintain a healthy environment.

Typical aquarium filters rely on mechanical filtration to remove detritus from the aquarium water. Such a mechanical filter can be one of several types. For example, in under gravel type filtration systems, a pump circulates the aquarium water through a bed of gravel supported on a suitable structure. The gravel bed, which is typically located within the aquarium, traps and removes solid wastes and detritus from the water as it flows through the bed. In other mechanical filtration systems, a pump removes aquarium water from the aquarium and circulates the water through a filter element and back into the aquarium. Like the gravel bed, the filter element traps and removes harmful detritus from the circulating aquarium water.

In addition to mechanical filtration, chemical filtration can be used to maintain a healthy, life-supporting environment within an aquarium. Chemical filtration systems typically circulate the aquarium water through a chemical filter element, such as activated carbon. This type of filtration is helpful in removing dissolved organic compounds and carbon dioxide and can help to maintain a stable pH within the aquarium.

However, neither mechanical nor chemical filtration techniques are typically effective in removing such waste byproducts as ammonia, nitrites, or nitrates. Some of these nitrogen based contaminants, particularly ammonia, can be extremely harmful to the types of aquatic life typically found in aquariums. An effective method of removing such contaminants is biological filtration. Biological filtration relies on the presence of aerobic bacteria to convert some water born toxic wastes, particularly ammonia, to nontoxic or less toxic substances. It is possible for aerobic bacteria to grow, to a limited extent, on mechanical filter elements. Thus, there may be some biological filtration along with the mechanical filtration described above.

However, typically, the aerobic bacteria which grows on the mechanical filter elements, or the under gravel bed, must rely on the dissolved oxygen present in the water for its growth. As a result of the limited availability of oxygen, coupled with reduced water flow as the filter becomes plugged, the amount of aerobic bacteria, and hence the degree of biological filtration, associated with mechanical filter elements or under gravel beds is inherently limited. Further, as mechanical filter elements become plugged with detritus they must be replaced in order to maintain water flow. Each time a filter element is replaced, any aerobic bacteria which may have colonized the filter element are removed from the aquarium and the colonization must restart on the new filter element. During the recolonization period, the environmental balance within the aquarium may be jeopardized by the absence of sufficient amounts of aerobic bacteria.

Trickle filters have been devised as one method of fostering the growth of aerobic bacteria and increasing the efficiency of the biological filtration process. In trickle filters, water is typically removed from the aquarium and allowed to trickle over a bed of lava rock, plastic balls, or the like. Because the filter bed is not submerged, there is more oxygen available for the growth of aerobic bacteria. However, trickle filters can take up a relatively large area and usually require dedicated plumbing and pump fixtures. As a result, such filters can be expensive and impractical in most applications and are not particularly useful for the average home aquarium.

Large scale wastewater treatment facilities frequently use rotating biological contactors in an effort to promote the growth of aerobic bacteria. Rotating biological contactors typically include a number of partially submerged filter elements, frequently disc shaped, mounted along a central shaft. The central shaft is driven to rotate the elements such that at least a portion of each filter element is alternately submerged and exposed to the air. In this manner, the growth of aerobic bacteria on the surface of the filter elements is promoted by the intermittent exposure to the oxygen in the air and the biological filtration of the wastewater is promoted by the intermittent submersion of the bacteria bearing surfaces. However, rotating biological contactors from wastewater treatment facilities are not readily compatible for use with home aquarium systems. In part, this is due to their large size, the need for a separate drive mechanism, and the lack of an appropriate location for such a device within the aquarium.

SUMMARY OF THE INVENTION

Accordingly, an object of the present invention is to provide an aquarium filter system which effectively reduces the quantity of toxic substances, particularly ammonia, in aquarium water.

A further object of the invention is to provide an aquarium filter system which is reliable and easily manufactured.

Another object of the invention is to provide an aquarium filter system which is compact, easy to install, and simple to use.

In accordance with these and other objects, an aquarium filter system in accordance with the present invention comprises a rotatably mounted filter body. The filter body is structured such that when mounted with a portion of the filter body submerged in moving water, rotational movement is imparted to the filter body by the moving water, thereby exposing at least a portion of said filter body alternately to the water and the atmosphere.

Other objects and aspects of the invention will become apparent to those skilled in the art from the detailed description of the invention which is presented by way of example and not as a limitation of the present invention.

DESCRIPTION OF THE ILLUSTRATED EMBODIMENT

Figure 1:
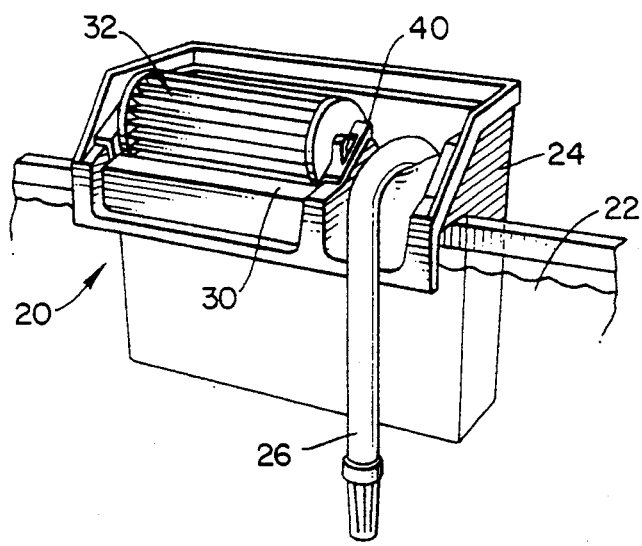
FIG. 1 shows a filter system in accordance with a preferred embodiment of the present invention.

An aquarium filter system in accordance with a preferred embodiment of the present invention is indicated in FIG. 1 as reference numeral 20. In the illustrated filter system 20, water is drawn from the aquarium 22 and into the rear portion of a filter box 24 through an intake tube 26 by an impeller assembly (not shown). The aquarium water then flows through the mechanical filter cartridge 28 (seen best in FIG. 2), into the front portion of filter box 24, and over the discharge lip 30 back into the aquarium. A biological filter element 32 is rotatably mounted over the discharge lip 30 and partially submerged within the flowing aquarium water. The flowing aquarium water impinging on the biological filter element 32 causes the biological filter element 32 to rotate, alternately exposing a portion of the biological filter element to the air and the aquarium water to foster the growth of aerobic bacteria on the surface of the biological filter element and to bring the aerobic bacteria into contact with the aquarium water. In this manner, the aerobic bacteria on the surface of the biological filter element can remove toxins, including ammonia, from the aquarium water.

Figure 2:
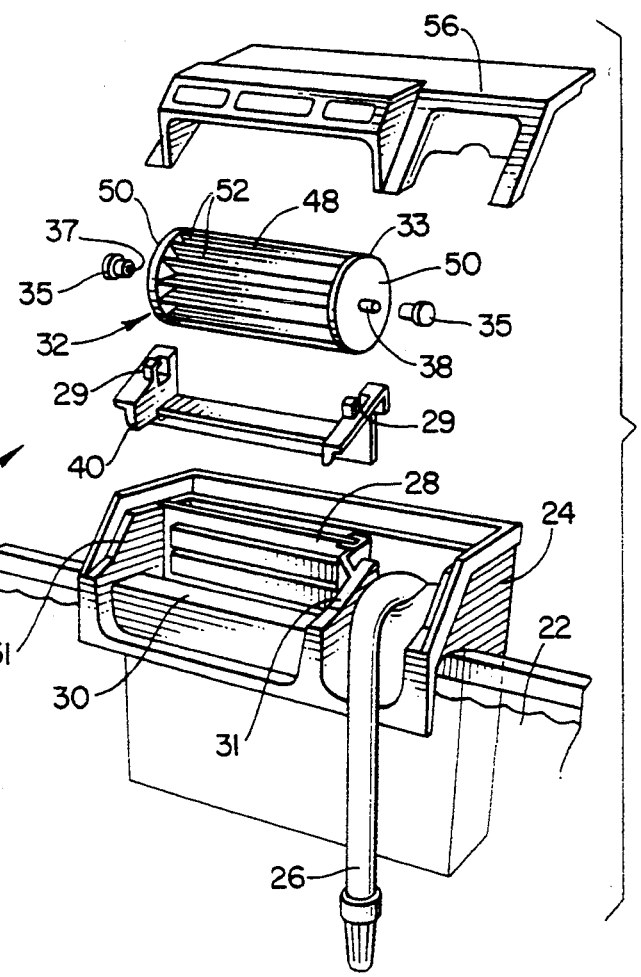
FIG. 2 is a partially exploded view of the embodiment of FIG. 1.
Figure 3:
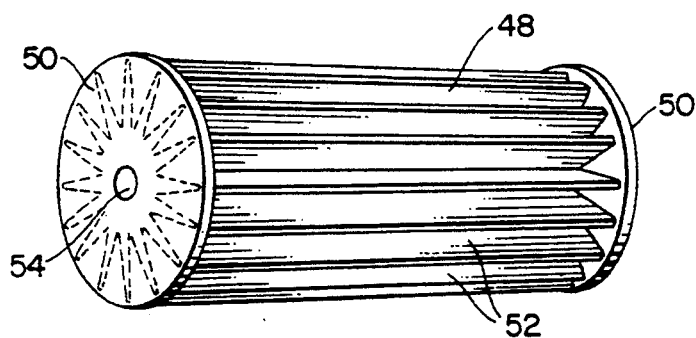
FIG. 3 shows an alternative embodiment of the filter body from the system of FIG. 1.

As best seen in FIG. 2, the biological filter element 32 includes a filter body 33 mounted on a shaft 38. The filter body 33, is a turbine formed from a pleated sheet 48 of porous filter material held in a cylindrical shape between two disks 50. The pleats 52 each extend radially from the center of the cylinder and axially between the disks 50 to serve as paddles. The disks 50 may be of molded elastomeric or polymeric material and may be formed with a stub shaft 38 extending outwardly therefrom. Alternatively, as seen in FIG. 3, each disk 50 may be provided with an aperture 54 for receiving a central shaft 38. It is also possible to use extruded porous polymer or injection molded porous polymer instead of the pleated sheet 48.

As illustrated in FIGS. 1 and 2, the biological filter element 32 is disposed above the discharge lip 30 of a power filter system. In the illustrated embodiment, a saddle 40 is provided to support the biological filter element. The saddle 40 is shaped to straddle triangular elements 31 on each side the discharge lip 30. Each end of the saddle is provided with a retaining recess 29 into which a bearing 35 is snap fit. Each bearing 35 is provided with an aperture 37 for receiving an end of shaft 38. The aperture 37 is sized so as to allow free rotation of the shaft 38 therein. Each retaining recess 29 is configured to loosely support the bearing 35 after it has been snapped into place so as to allow the bearing to align itself with the shaft 38. In this manner the filter body 33 is rotatably suspended above the discharge lip 30.

The filter body 33 is suspended with only a slight clearance, approximately 0.03–0.06 inches in the illustrated embodiment, above the discharge lip 30. As a result, water flowing over the discharge lip 30 and back into the aquarium impinges on the filter body, causing the biological filter element to rotate. Because of the configuration and location of the filter body, the filter system of the present invention does not require a separate drive means for the rotating biological filter element. This substantially reduces the cost and complexity of the filter system and makes it ideal for use by the aquarium hobbyist.

The slight clearance between the filter body 33 and the discharge lip 30, also allows for filter body 33 to be submerged to the maximum depth within the flowing water. Ideally, the filter body and the discharge lip should be dimensioned such that in normal operation approximately 40–50% of the biological filter element is submerged, or wetted, at any time and substantially all of the biological filter element is alternately exposed to the atmosphere and the water. This utilizes substantially the entire surface of the biological filter element for the growth of aerobic bacteria and maximizes the contact of the aerobic bacteria with both the impinging water and the atmosphere.

In the embodiment of FIGS. 1 and 2, the saddle 40 can be easily removed from the discharge lip 30. This allows for simple removal of the biological filter element during maintenance of the other elements of the filter system and also allows for easy adaptation and installation of the rotating biological filter element for use in existing power filter systems. However, it should be understood that there are a variety of other satisfactory methods, some of which are described subsequently, for mounting the biological filter element within an aquarium filter system. Accordingly, the scope of the present invention should not be limited by those methods expressly described herein.

Figure 4:
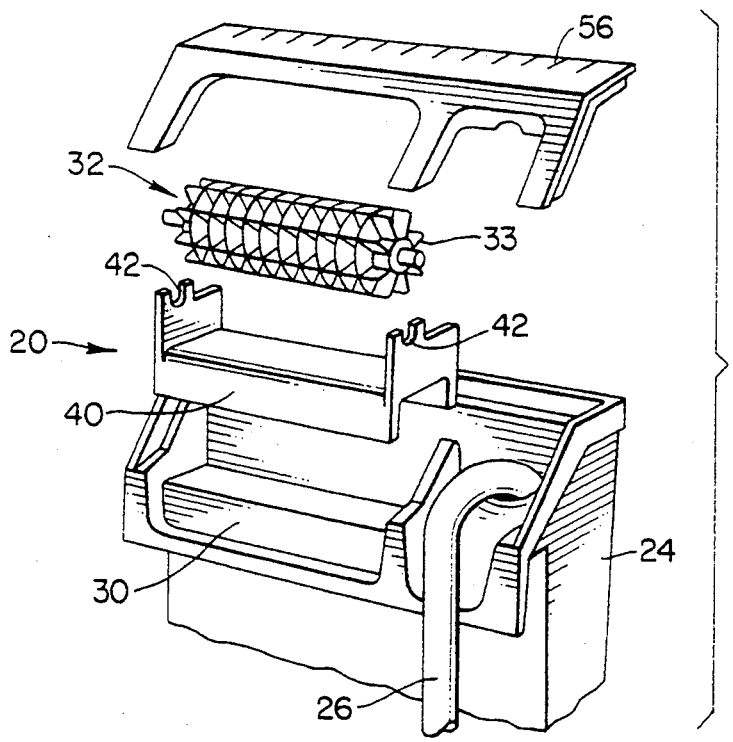
FIG. 4 shows a filter system in accordance with an alternative preferred embodiment of the present invention.
Figure 5:
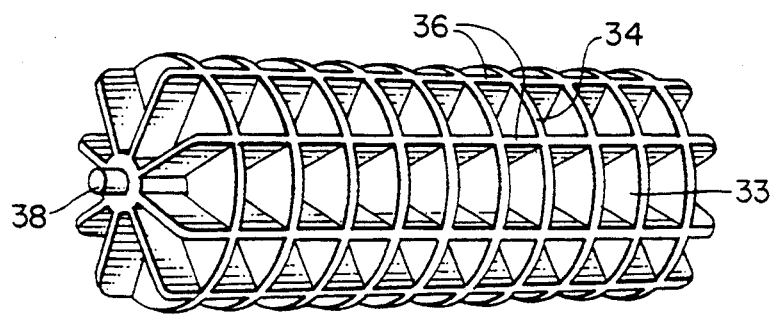
FIG. 5 shows the filter body of FIG. 4.

In an alternative embodiment, illustrated in FIGS. 4 and 5, the filter body 33 has a number of disks 34 maintained in an axially spaced relation by paddles 36. A shaft 38 extends axially from each end of the filter body 33. In the embodiment of FIG. 5, the shaft 38 extends through the center of the filter body 33 from one end of the filter body to the other. However, in other embodiments, it may be desirable to provide a stub shaft on each end of the filter body rather than a single shaft extending through the entire filter body.

Figure 6:
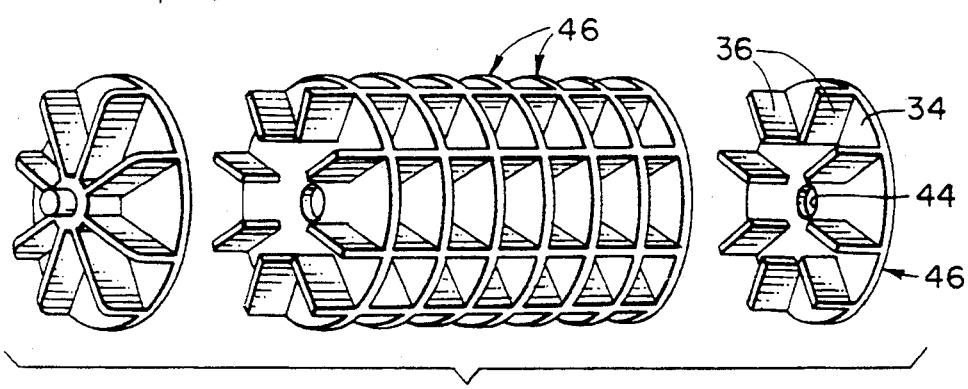
FIG. 6 is a partially exploded view of the filter body of FIG. 2.

As illustrated in FIG. 6, the filter body 33 may be modular in construction. In FIG. 6, each module 46 comprises a disk 34 with a plurality of radially oriented paddles 36 extending from one side of the disk 34. An aperture 44 for receiving the shaft 38 is provided in the center of the disk 34. The filter body 33 is comprised of a number of modules received on the shaft 38. The modules may be coupled to one another by means of an adhesive, a snap fit, a friction fit, or any other manner well known to those skilled in the art. Modular construction of the filter body can greatly simplify manufacture of the filter body because a variety of filter bodies having different dimensions can be produced merely by varying the number of modules and the length of the shaft. Further, it may be easier to mold the individual modules than to mold the entire filter body at one time.

The paddles 36 increase the efficiency of the rotation of the filter body by the flowing water. In addition, the paddles allow for improved biological filtration by increasing the wetted surface area available for growth of the aerobic bacteria and contact with the water. In alternative embodiments, it may be desirable to further increase the surface area by texturing the surfaces of the modules and paddles. Although the modules of FIG. 6 each have eight uniformly spaced radially oriented paddles, the optimum number and orientation of the paddles may vary depending on the particular dimensions of the biological filter body and the discharge lip.

In some embodiments it may also be desirable to loosely pack the hub area of each module between the shaft and the paddles with a porous filter media to increase the surface area available for the growth of aerobic bacteria. In other embodiments it may be desirable to have the paddles extend all the way to the shaft.

Preferably, the structure of the filter body should be such that, in combination with the surface tension of the water, the water tends to well up into the hub area to maximize the wetted area. This is particularly desirable in shallow water applications where the filter body may be less than half submerged.

Figure 7:
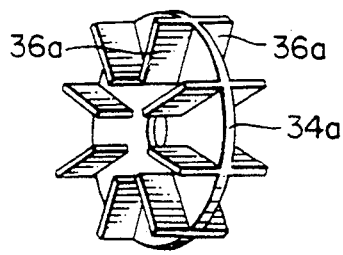
FIG. 7 is a module of a filter body in accordance with another embodiment of the invention.
Figure 8:
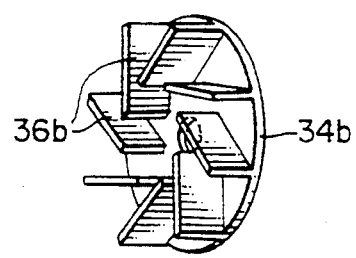
FIG. 8 is a module of a filter body in accordance with another embodiment of the invention.
Figure 9:
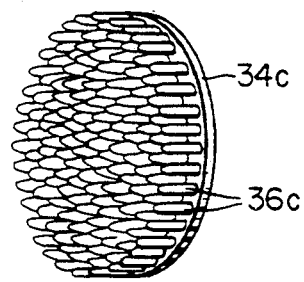
FIG. 9 is a module of a filter body in accordance with another embodiment of the invention.

Alternative module configurations are shown in FIGS. 7, 8 and 9. In FIG. 7, paddles 36a extend from each side of disk 34a. In FIG. 8, the paddles 36b are angled slightly from the radial orientation of FIG. 6. Depending on the direction of flow as the water moves over the discharge lip, such a configuration may be more efficient than that of FIG. 6. In FIG. 9, a multitude of projections 36c extend perpendicularly from disk 34c. Such a configuration greatly increases the surface area of the module. However, if the projections are spaced too closely, water may become trapped between the projections and prevent the efficient exposure of the surface of the filter body to the air. It should be appreciated that there are a variety of other filter body and module configurations which could be incorporated into the biological filter of the present invention. It is within the contemplation of the present invention that the biological filter body could be made of any combination of one or more of the possible configurations.

Figure 10:
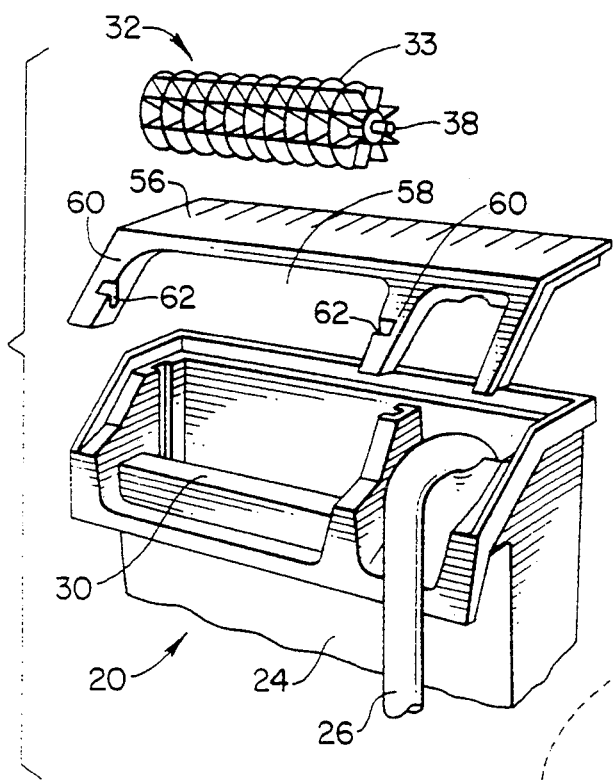
FIG. 10 shows a filter system in accordance with another embodiment of the invention.
Figure 11:
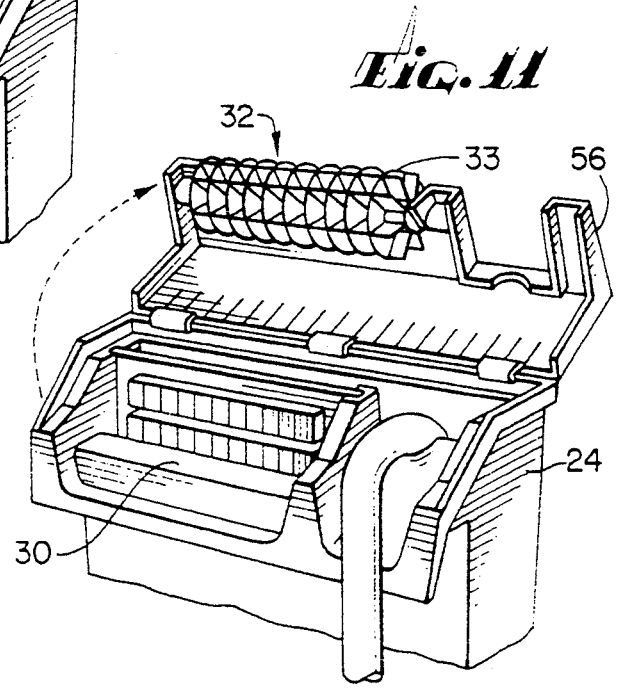
FIG. 11 shows the embodiment of FIG. 10 with the filter system lid pivoted to the open position.

FIGS. 10 and 11 show an alternative embodiment of the present invention adapted for use with a power filter system. In this embodiment, the power filter system 20 is provided with a lid pivotally mounted along the top of the rear wall of the filter box 24. The front of the lid 56 is provided with a cut out section in the region 58 over the discharge lip 30. The side walls 60 of the cut out region 58 are each provided with journals 62 for rotatably receiving the ends of shaft 38. In this manner, when the lid is closed as in FIG. 10, the biological filter element 32 is suspended over the discharge lip 30 in a position to be rotated by water flowing over the discharge lip. When the lid is pivoted to the open position, shown in FIG. 11, the biological filter element is removed from the space over the discharge lip to allow ready access for maintenance or repair of the remaining elements of the filter system. The journals 62 can be provided with detents, or some other mechanism, to prevent the biological filter 32 from falling out when in the open position. Alternatively, bearings of the type described above may be used in place of the journals 62. Of course, any of the alternative filter bodies described above could be used in the embodiment of FIGS. 10 and 11.

Figure 12:
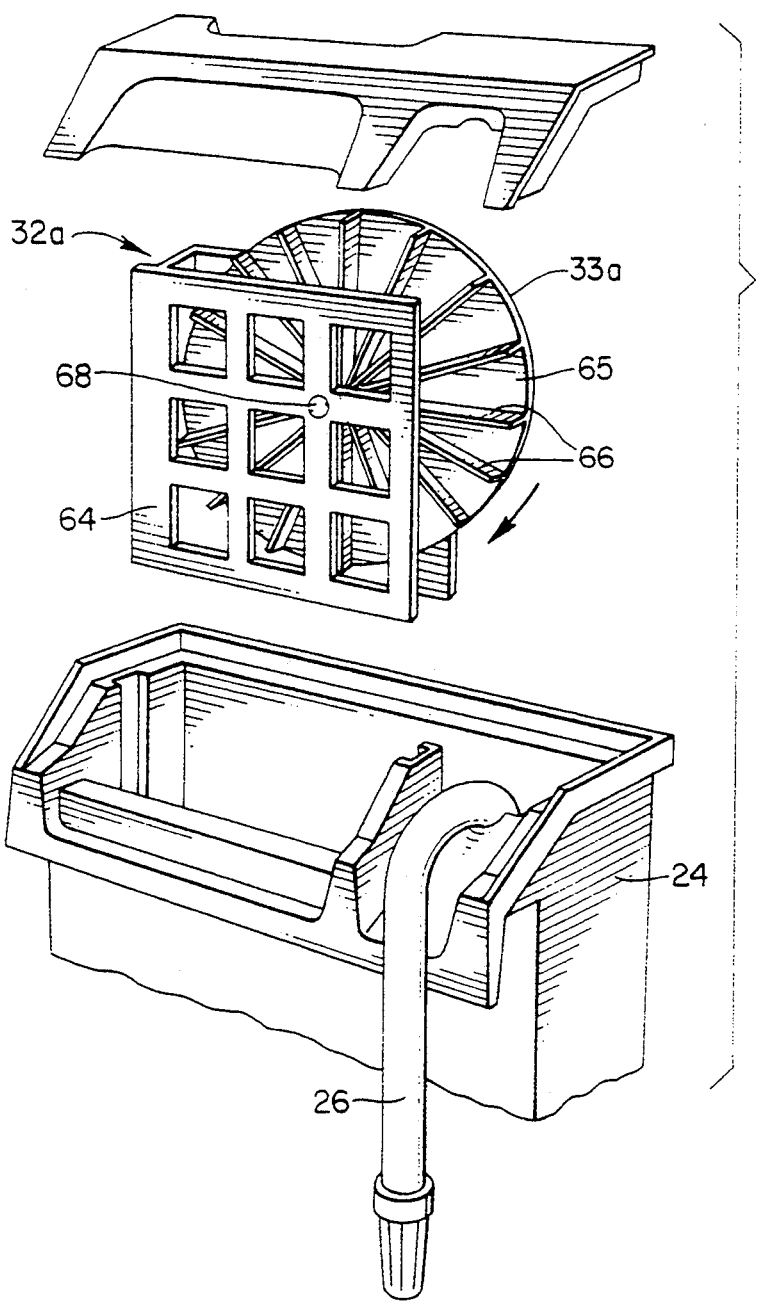
FIG. 12 shows another embodiment of the rotating biological filter element in another embodiment of the filter system.
Figure 13:
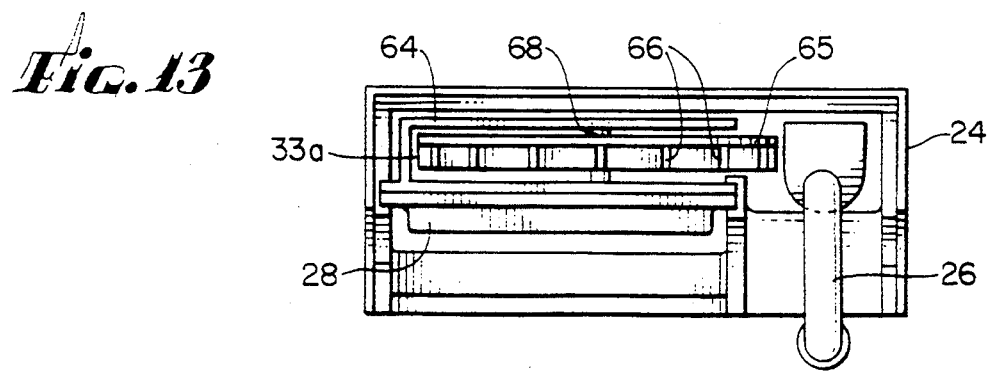
FIG. 13 shows a top view of the embodiment of FIG. 12.

FIGS. 12 and 13 show another embodiment of the present invention adapted for use with a power filter system. As shown in FIG. 12, biological filter element 32a includes a filter body 33a and a supporting cage 64. The filter body 32a comprises a single disk 65 with a plurality of radially extending paddles 66. The disk 65 is centrally mounted on shaft 68 which is rotatably supported by the cage 64. The cage 64 is configured to fit within the filter box 24 behind the filter cartridge 28. The cage 64 supports the filter body 33a in a plane generally parallel to the filter cartridge 28. As best seen in FIG. 13, the paddles 66 are positioned such that the water leaving the impeller housing (not shown) impinges on the paddles 66 to cause the filter body to rotate.

Figure 14:
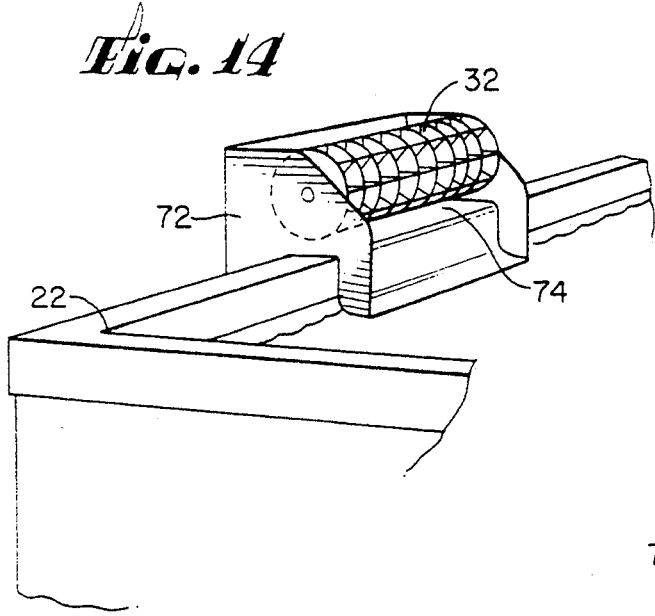
FIG. 14 shows another embodiment of a filter system in accordance with the present invention.
Figure 15:
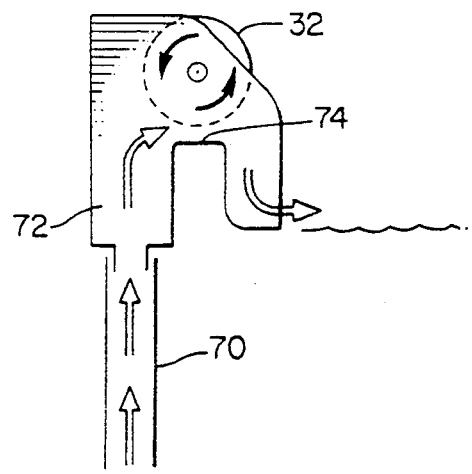
FIG. 15 shows a side view of the embodiment of FIG. 14.

The present invention can also be adapted for canister or other types of filter systems as shown in FIGS. 14 and 15. As seen in FIG. 14, the outlet tube 70 from the canister filter system, or other type of external filtration system, outlets into holding reservoir 72. The holding reservoir 72 is provided with a discharge lip 74 similar to the discharge lip 30 of the power filter system 20. Water within the reservoir 72 flows over the discharge lip 74 and into the aquarium. A biological filter element 32 is positioned over the discharge lip 74 such that the flowing water imparts rotational movement to the biological filter element 32. The discharge lip 74 can straddle the edge of the aquarium to support the reservoir 72.

Figure 16:
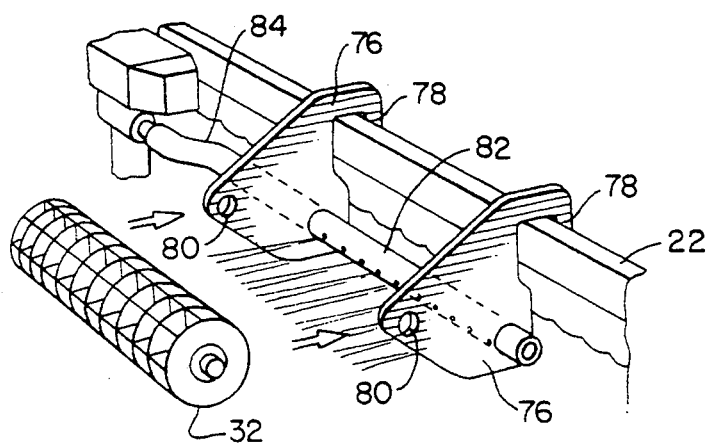
FIG. 16 shows a further embodiment of a filter system in accordance with the present invention.
Figure 17:
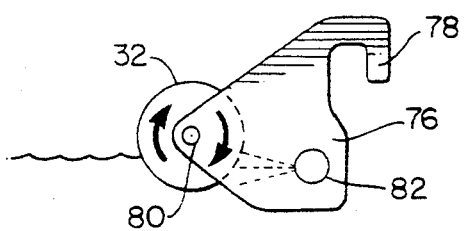
FIG. 17 shows a side view of the embodiment of FIG. 16.

In another embodiment, illustrated in FIGS. 16 and 17, the biological filter element 32 is partially submerged directly in the aquarium water. The biological filter element is supported by journals 80 provided in support brackets 76. The support brackets 76 are maintained in position within the aquarium by means of hooks 78 which overhang a wall of the aquarium 22. Rotational movement is imparted to the biological filter element 32 by water flowing from the spray bar 82 which is also supported by the brackets 76. The spray bar may be connected to the outlet tube 84 of a pump or similar aquarium device. This configuration is particularly well suited for applications requiring a large filter body because the filter body can extend substantially along an entire wall of the aquarium.

A wide variety of filter bodies have been described herein. It should be appreciated that to a large degree, these filter bodies are interchangeable. Accordingly, the fact that a particular filter system is illustrated using a particular type of filter body should not be taken to limit the scope of the invention in any way. Rather, the different filter bodies described, as well as variations thereof, may be applied to a large number of filter systems. The particular filter body for each application is to a large degree a matter of choice and may be based on factors such as expense, availability, ease of manufacture, and the like. Further, submersion of the filter body to rotate and wet the filter may be accomplished in a variety of manners, such as directing a flow of water over the filter such that it falls onto the filter or spraying a flow of water onto a portion of the filter body.

This detailed description is set forth only for purposes of illustrating examples of the present invention and should not be considered to limit the scope thereof in any way. Clearly numerous additions, substitutions, and other modifications can be made to the invention without departing from the scope of the invention which is defined in the appended claims and equivalents thereof.

What is claimed is:

1. A filter system for filtering aquarium water comprising:
    a filter box;
    a filter screen dividing said filter box into a first compartment and a second compartment;
    means for circulating aquarium water from the aquarium to the first compartment said water flowing through the filter screen from the first compartment and into the second compartment;
    a discharge lip through which water can flow from the second compartment into the aquarium; and
    a rotatable filter element adjacent to the discharge lip, said filter element being positioned to be partially submerged in the aquarium water such that rotational movement is imparted to the filter element by the flowing water, wherein at least a portion of the rotatable filter element is exposed alternately to the aquarium water and the air to foster the growth of aerobic bacteria on the surface of the filter element.

2. The filter system of claim 1 wherein the rotating filter element comprises a filter body having a disk shaped portion with a plurality of radially oriented blades extending therefrom and said filter body is mounted on a central axle.

3. The filter system of claim 2 wherein the rotating filter element further comprises a second disk shaped portion wherein the blades are made of a sheet of pleated porous material extending from the first disk shaped portion to the second disk shaped portion.

4. The filter system of claim 1 wherein the filter element comprises a portion of porous material.

5. An aquarium, comprising:
    a containment vessel having a plurality of walls for containing aquarium water;
    a filter box, said filter box being disposed adjacent at least one wall of the vessel;
    means for circulating aquarium water between the vessel and the filter box, wherein the circulating means includes a discharge lip positioned adjacent the filter box and over at least one vessel wall, such that water flows from the filter box over the discharge lip into the vessel; and
    a rotatable filter element suspended adjacent the discharge lip, said filter element being positioned to be momentarily immersed in the aquarium water such that rotational movement is imparted to the filter element by the flow of water flowing over the discharge lip, wherein at least a portion of the rotatable filter element is exposed alternately to the aquarium water and the atmosphere.

6. The filter apparatus of claim 5 wherein the rotatable filter element comprises a central axle, and filter body having a disk shaped portion with a plurality of radially oriented blades extending from the disk shaped portion, said filter body being mounted on the central axle adjacent the filter box and the discharge lip.

7. The filter apparatus of claim 6 wherein the filter element comprises at least a portion of porous material.

8. The filter apparatus of claim 6 further comprising a second disk shaped portion wherein the blades comprise a sheet of pleated porous material extending about the central axle from the first disk to the second disk.

9. The filter apparatus of claim 6 wherein the blades are angled slightly from the radial orientation.

10. A filter apparatus for an aquarium filter system for an aquarium having walls, said filter system producing a flow of moving water, comprising:
    a filter container adjacent at least one wall;
    a discharge lip for water flowing from the filter container into the aquarium;
    a rotatable filter element; and
    a saddle adapted to be received by the discharge lip, and for rotatably carrying the filter element so that the filter element is positioned to be momentarily immersed in the aquarium water such that rotational movement is imparted to the filter element by the flow of water flowing over the discharge lip, wherein at least a portion of the rotatable filter element is exposed alternately to the aquarium water and the atmosphere.

11. The filter apparatus of claim 10 wherein the filter element is comprised of a filter body having a plurality of disks and a plurality of paddles extending axially between the disks.

12. The filter apparatus of claim 10 wherein at least a portion of the filter element is comprised of a porous material.

13. An aquarium comprising:
    a containment vessel having a plurality of walls for containing aquarium water;
    a housing mounted adjacent a wall of said vessel and defining a flow path for flow of aquarium water from said containment vessel, through said housing and back to said containment vessel;
    a rotatable filter element supported by said housing to be partly immersed in aquarium water flowing along said flow path in a manner such that rotational movement is imparted to said filter element by the water flowing along said flow path and at least a portion of said filter element is alternately immersed in the water flowing along said flow path and exposed to the atmosphere, wherein said filter element includes a body of a porous filter material for supporting bacteria, said body of porous filter material has radially extending portions which are disposed such that water flowing along the flow path impinges on the radially extending portions and rotates said filter element.

14. The aquarium of claim 13 wherein said filter element has a central axle and said body of porous filter material provides a large effective surface area for promoting bacteria growth.

15. The aquarium of claim 14 wherein the filter element comprises a disk shaped portion and said radially extending portions comprise a plurality of blades extending from the disk shaped portion.

16. The aquarium of claim 15, wherein said filter element is elongated and cylindrical.

17. The aquarium of claim 15, wherein the plurality of blades comprises elongated paddles.

18. The aquarium of claim 17, wherein porous filter material is loosely packed inside said filter element for increasing biological filtration and aerobic bacteria growth.

19. The aquarium according to claim 17, wherein said filter element comprises a plurality of modules, each module having a disk and intersected elongated blades, each module being individually separable from other modules.

20. The aquarium according to claim 19, wherein the plurality of modules are coupled to one another, defining a modular elongated cylindrical filter system.

21. The aquarium of claim 15 wherein said filter element comprises a second disk shaped portion, and said blades extend between said first-recited disk shaped portion and said second disk shaped portion.

22. The aquarium of claim 13 wherein: said filter element comprises a disk shaped portion and said radially extending portions comprise a plurality of blades extending from the disk shaped portion; said body of porous filter material provides a large effective surface area for promoting bacteria growth; and said filter element is mounted such that rotation is imparted to said filter element by impingement, on each blade in turn, of aquarium water flowing along said flow path.

23. The aquarium of claim 13 further comprising a filter screen situated in said housing and interposed in said flow path for removing detritus from aquarium water flowing along said flow path.

24. The aquarium of claim 13 wherein said filter element has an axis of rotation and said body of porous filter material comprises a pleated sheet of porous material which extends around said axis of rotation.

25. The aquarium of claim 13 wherein said filter element comprises a disk shaped portion and a plurality of projecting members extending perpendicularly from said disk shaped portion.

* * * * *